US010565956B2

(12) United States Patent
Khorasani et al.

(10) Patent No.: US 10,565,956 B2
(45) Date of Patent: Feb. 18, 2020

(54) METHOD AND APPARATUS FOR LIGHT SPECTRUM FILTERING

(71) Applicant: Motorola Mobility LLC, Chicago, IL (US)

(72) Inventors: Maziyar Khorasani, San Francisco, CA (US); Kevin McDunn, Saint Charles, IL (US); Seang Chau, Los Altos, CA (US); Kevin Foy, Chicago, IL (US); Lauren Schwendimann, Evanston, IL (US); Xiaodong Xun, Plalatine, IL (US); Joseph Swantek, Downers Grove, IL (US); Mir Farooq Ali, Rolling Meadows, IL (US); Jun Ki Min, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 405 days.

(21) Appl. No.: 15/360,877

(22) Filed: Nov. 23, 2016

(65) Prior Publication Data

US 2018/0144714 A1 May 24, 2018

(51) Int. Cl.

| | |
|---|---|
| ***G06F 3/038*** | (2013.01) |
| ***G09G 5/00*** | (2006.01) |
| ***G09G 5/02*** | (2006.01) |

(52) U.S. Cl.

CPC ....... *G09G 5/02* (2013.01); *G09G 2320/0666* (2013.01); *G09G 2360/144* (2013.01)

(58) Field of Classification Search

CPC ..... G09G 2320/0666; G09G 2360/144; G09G 5/02

See application file for complete search history.

(56) References Cited

U.S. PATENT DOCUMENTS

| | | | | |
|---|---|---|---|---|
| 2015/0022098 A1* | 1/2015 | Knapp | G09G 3/2003 315/161 |
| 2015/0070337 A1* | 3/2015 | Bell | G09G 3/2003 345/207 |
| 2015/0348468 A1 | 12/2015 | Chen et al. | |
| 2016/0140889 A1* | 5/2016 | Wu | G09G 3/2003 345/207 |

OTHER PUBLICATIONS

Min, Toss 'n' turn: smartphone as sleep and sleep quality detector, ACM Digital Library, Nov. 20, 2016, http://dl.acm.org/citation.cfm?id=2557220.

* cited by examiner

*Primary Examiner* — Insa Sadio

(74) *Attorney, Agent, or Firm* — Loppnow & Chapa; Matthew C. Loppnow

(57) ABSTRACT

A method and apparatus filter light spectrum. Ambient light conditions of light that is ambient to a user device can be sensed. Ambient light color conditions can be determined based on the sensed ambient light conditions. User device charging times when the user device is being charged can be monitored. User device motion including movement of the user device can be monitored. User device activity can be monitored. Color-modified image display times can be ascertained from at least one selected from the user device motion, the user device activity, and the user device charging times. A color-modified image can be generated based on at least the ambient light color conditions and the color-modified image display times. The color-modified image can be displayed.

20 Claims, 4 Drawing Sheets

METHOD AND APPARATUS FOR LIGHT SPECTRUM FILTERING

BACKGROUND

1. Field

The present disclosure is directed to a method and apparatus for light spectrum filtering. More particularly, the present disclosure is directed to modifying an image based on ambient light and sleep patterns to influence the human circadian system.

2. Introduction

Presently, people have specialized photoreceptors, such as melanopsin photopigment, in their eyes that regulate the circadian rhythms by influencing the secretion of a hormone, melatonin. Significant research has shown that exposure to specific bands of blue light, such as 459-485 nm wavelengths of light, in the evening, even at low intensities, suppresses the release of melatonin, and consequently shifts the circadian clock to a later time, which negatively affects people's sleep if viewed before bedtime. In fact, research suggests that an average person reading on an electronic device for a couple hours before bed may find that their sleep is delayed by about an hour.

Existing solutions reduce the exposure of blue light through the application of a manual or automatic color filter. An example of automatic color filtering uses geographical location and time information entered into a software program on an electronic device. The software program then calculates whether a color shift is necessary or the degree of the color shift based on the time of day, such as in the morning or later in the evening.

Unfortunately, a byproduct of manual or automatic filtering is that such solutions negatively alter the aesthetic appearance of the light emitting on a display of the electronic device, such as by modifying the colors to generally warmer colors, particularly in situations in which the color filter may be applied, but is really superfluous. For example, this happens when there is an existing ambient blue light source aside from the light being emitted from the specific electronic device on which a blue light filter is applied. When there is no other ambient blue light source, the effect of filtering out the blue light on a device is not as perceptible to the user because there is no other reference to compare it to. However, when there is another ambient blue light source, the user perceives the color shift as an undesirable yellowish tint on the display of the device. Thus, in such situations, existing solutions unknowingly and unnecessarily negatively impact the aesthetic experience of the user.

One example of this is a night shifting algorithm. If the algorithm is enabled, it determines the time that a color filter should be applied, such as at sunset based on geographic location. However, as soon as the user turns on a television, a Light Emitting Diode (LED) light source, a computer monitor, or other light source, the protection from blue light offered by the night shifting algorithm on a device will be negated by the blue light now being emitted by ambient devices, such as the television. Therefore, it makes no sense to unnecessarily retain the blue light filter state and reduce the quality of the user experience.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for light spectrum filtering. According to a possible embodiment, ambient light conditions of light that is ambient to a user device can be sensed. Ambient light color conditions can be determined based on the sensed ambient light conditions. User device charging times when the user device is being charged can be monitored. User device motion including movement of the user device can be monitored. User device activity can be monitored. Color-modified image display times can be ascertained from a at least one selected from the user device motion, the user device activity, and the user device charging times. A color-modified image can be generated based on at least the ambient light color conditions and the color-modified image display times. The color-modified image can be displayed.

Figure 1:
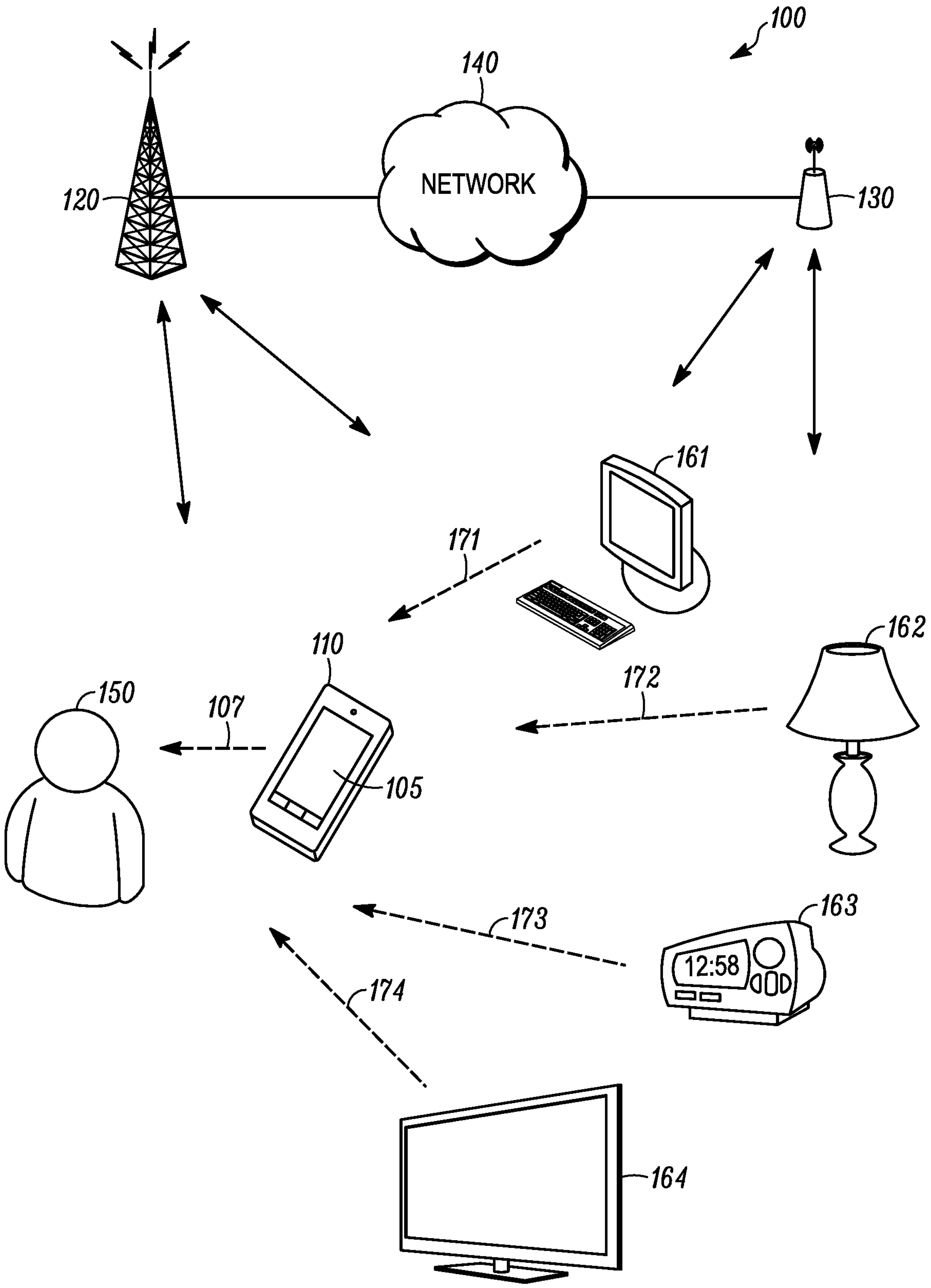
FIG. 1 is an example block diagram of a system according to a possible embodiment.

FIG. 1 is an example block diagram of a system 100 according to a possible embodiment. The system 100 can include a user device 110, a base station 120, an access point 130, and a network 140. The system 100 can also include other devices 161-164. The user device 110 can be a wireless terminal, a User Equipment (UE), a portable wireless communication device, a smartphone, a cellular telephone, a flip phone, a personal digital assistant, a device having a subscriber identity module, a personal computer, a selective call receiver, a tablet computer, a laptop computer, or any other device that is capable of displaying an image on a display. The user device 110 can include a display 105 that can emit light 107 that can be viewed by a user 150.

The base station 120 can be a cellular base station, a Wireless Wide Area Network (WLAN) base station, an enhanced NodeB (eNB), a Global System for Mobile communication (GSM) base station, and/or other base stations. The access point 130 can be a Wireless Local Area Network (WLAN) access point, an 802.11 access point, a wireless router, and/or other access points. The system 100 can also include additional wireless and wired devices that can provide communication between devices and networks. The devices 110 and 161-164 can communicate with the network 140 and each other via the base station 120, via the access point 130, via other wired and wireless devices, via direct wireless and wired communication signals, and/or via other methods of communication.

The other devices 161-164 can include a computer 161, a lamp 162, an alarm clock 163, a television 164, and additional devices. The additional devices can include laptop computers, appliances, overhead lighting, stereo components, set top boxes, digital clocks, accent lights, personal portable devices, and other devices and light sources that can emit light. The other devices 161-164 can emit light 171-174, respectively, that can be viewed by the user 150.

The network 140 can include any type of network that is capable of sending and receiving communication signals. For example, the network 130 can include a wireless communication network, a wired communication network, the Internet, a cellular telephone network, a Public Land Mobile Network (PLMN) a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a satellite communications network, a high altitude platform network, and/or other communications networks.

In operation according to a possible embodiment, the user device 110 can be a portable electronic device with a display 105 that can adapt its output based on ambient light conditions, such as from light from devices 161-164 and other ambient light, and the user's sleep patterns to reduce the impact to the user's circadian cycle. According to a possible embodiment, the user device 110 can be a portable electronic device, but the user device 110 can also be other types of devices including tablets, laptop computers, connected light sources, appliances, televisions, and other devices. Furthermore, devices, such as the devices 110 and 161-64, can act in concert in terms of sensing the ambient lighting spectrum, directionality and intensity, communicating each device's own level of blue light transmission, and adjusting the blue light transmission of each device in response to the environmental lighting conditions, time of day, and other factors, such as by using a blue light filtering algorithm.

Along with a display, the user device 110 can contain blue light sensing system that can include ambient light sensors, imaging sensors, such as front and rear cameras, and other sensors disposed on the device 110 and on any other connected device that is in useful proximity to the user 150. These sensors can detect the magnitude and quality, such as spectral frequency and directionality relative to known models for blue light's disruptive effects on melatonin production, of the ambient blue light to generate at least one ambient value. The at least one ambient value can be compared to a computed value of blue light being emanated from the primary user device 110 and connected devices under the system's control to adjust, such as filter, the blue light output from at least one device.

Figure 2:
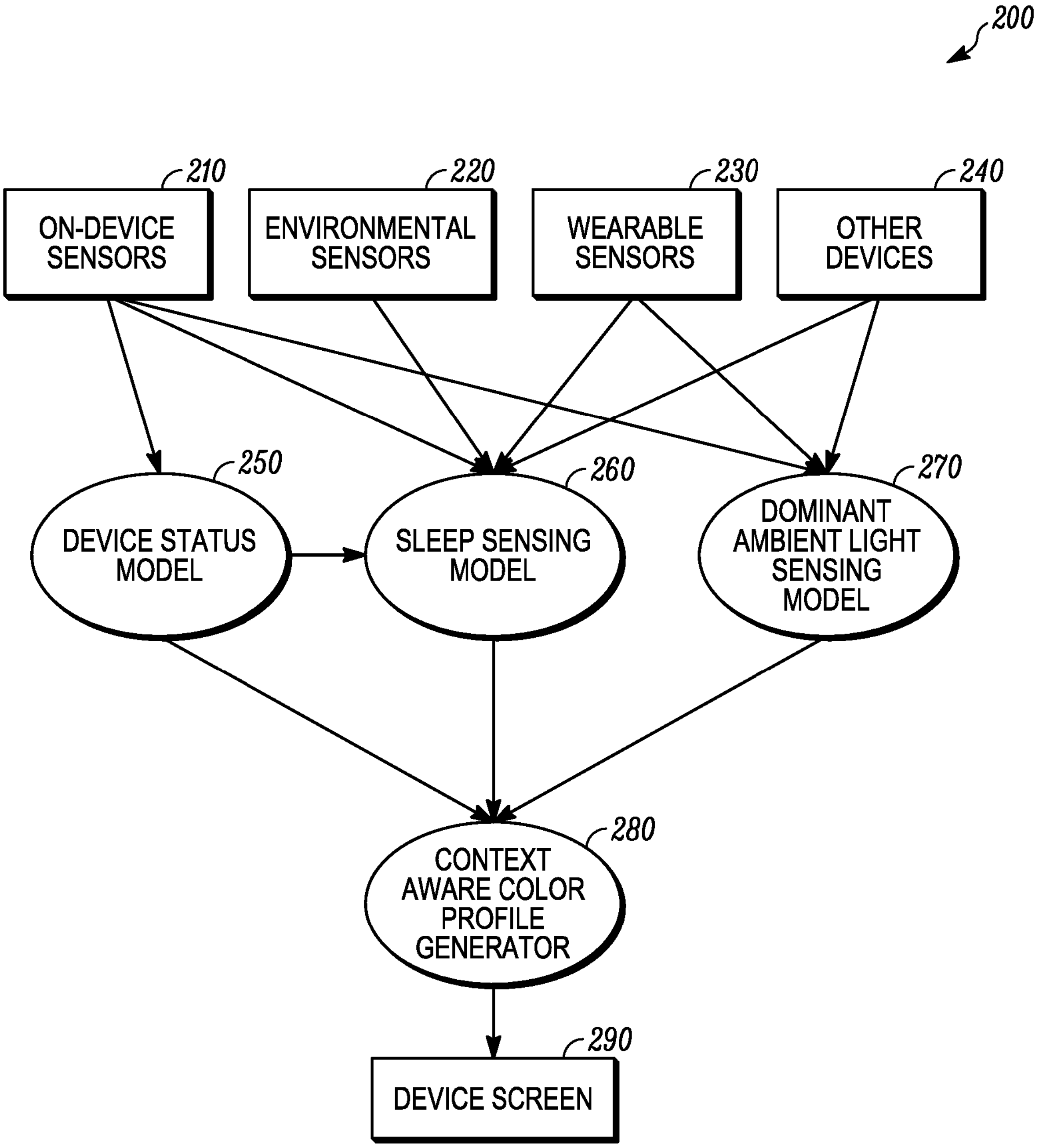
FIG. 2 is an example block diagram of a sleep sensing system according to a possible embodiment.

FIG. 2 is an example block diagram of a sleep sensing system 200 according to a possible embodiment. The sleep sensing system 200 can be implemented on the user device 110 and/or on other devices, such as the devices 161-164. The sleep sensing system 200 can include on-device sensors 210, environmental sensors 220, wearable sensors 230, other devices and sensors 240, a device status model 250, a sleep sensing model 280, a dominant light sensing model 270, a context aware color profile generator 280, and a device screen 290. All of the elements of the sleep sensing system 200 may or may not be used and additional elements can be used in the present embodiment or other embodiments. The sensors 210, 220, and 230 and/or other devices 240 can provide information to the models 250, 260, and/or 270. The models 250, 260, and/or 270 can then provide information to the context aware profile generator 280 that can generate a color-modified image for display on the device screen 290.

For example, a user's sleep state can be determined using a software and/or hardware sleep sensing model, S, 260 that can capture different patterns of human body motions, biosignals, and ambient contexts between awake, asleep, and their transitions by incorporating different types of pervasive sensing technologies. Sensors 210 disposed on the user's device and/or any other connected devices and systems 220, 230, and/or 240 that are in useful proximity to the user can be monitored. Sensors can include an ambient sound sensor, an ambient light sensor, a device status sensor, a movement sensor, a presence sensor, biosignal sensors, Radio Frequency Identification (RFID) tags, a weather sensor, a temperature sensor, and other sensors. According to a possible implementation, a device status sensor can sense whether the device is charging or not, can sense an idle state of the device, can determine alarm/calendar settings, can sense user interface interaction, and can sense other information about a device.

With captured information from the sensors, such as from a sensor array R, the sleep sensing model S 260 can yield the probability $P_t$ of user's sleep and wake status for the given time t by using pattern recognition techniques, such as sleep detection models that detect sleep and wake states, daily sleep quality, and global sleep quality that use noise, movement, and other information to infer sleep and wake states and sleep quality.

The sleep sensing model S 260 can approximate a person's melatonin production cycle, which can be responsible for the regulation of the body clock. The sleep sensing model S can have prebuilt sleep-templates of the sensor array values and/or can learn a person's behaviors over time based on the collected sensor array data. According to a possible example implementation, if user charges a phone battery every night before the user goes to bed, the model can produce higher $P_t$ at the moment the user plugs the phone to the power at night time to reflect a higher probability of sleep at that time.

According to an example embodiment that leverages the ambient light information and sleep state, when the sleep sensing model S 260 indicates that the user is within two hours of the user's sleep start time and not yet out of the sleep finish time and the blue light emanating from devices under the system's control is greater than a given percentage of the total ambient blue light, then the system can progressively filter the blue component of the display content for all system-controlled devices so that their proportional contribution remains less than the given percentage of that exposed to the user. Values used by the system 200 can be finely tune based on various parameters. Additionally, the sleep sensing model S 260 can be based on other inputs including proximity of the light emitting devices, intensity of light, and even the user's age.

According to an example embodiment of a context aware blue light control algorithm of the system 200 with respect to connected devices can use $$f(P_t,L,d)=C_b.$$

The context-aware blue light control algorithm $f(P_t, L, d)$ can generate an appropriate color profile $C_b$ with respect to the strength of blue light, where dominant ambient light L can be detected by using the sensor array R. Device status d can include context information about whether a user is potentially affected by $C_b$ or not, such as whether the screen is on, the proximity of the device and other light sources to the user, the user's presence status, and other context information.

Figure 3:
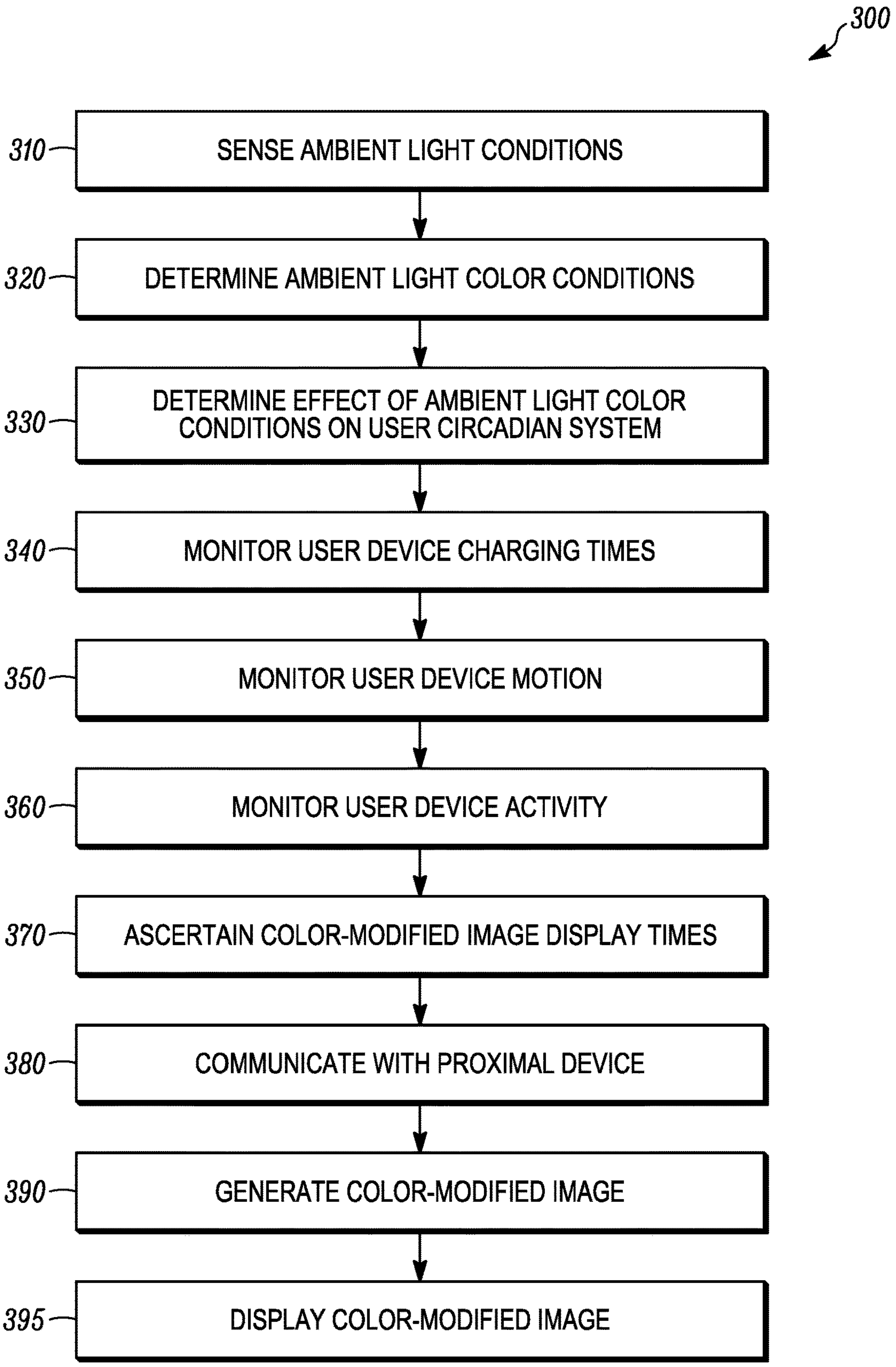
FIG. 3 is an example flowchart illustrating the operation of a user device according to a possible embodiment.

FIG. 3 is an example flowchart 300 illustrating the operation of a user device, such as the user device 110, and/or the sleep sensing system 200 according to a possible embodiment. At 310, ambient light conditions of light that is ambient to a user device can be sensed. Ambient light conditions of light that is ambient to the user device can be sensed using an ambient light sensor on the user device.

Ambient light conditions of light that is ambient to the user device can also be sensed by receiving information about ambient light conditions from sensors that are proximal to the user device and are wirelessly coupled to the user device.

According to possible different implementations, the ambient light color conditions can include a plurality of ambient light color conditions sensed by different sensors or otherwise received. For example, other devices proximal to a user device can sense ambient light color conditions and/or can report on their own color output that can affect ambient light color conditions. Other devices proximal to the user device can be in the same room as the user device and/or can be determined to otherwise influence ambient lighting conditions around the user device.

According to a possible implementation, the ambient light conditions can be sensed by other sensors that are proximal to and communicatively coupled to the user device and the other sensors can send signals regarding the ambient light conditions to the user device. The sent signals can be wireless or wired signals. The ambient light conditions can also be sensed based on knowledge of the location of user device, based on knowledge of devices connected, such as wirelessly connected, to the user device, based on the time of day, and based on other methods of sensing ambient light conditions. At least one dedicated ambient light sensor can sense ambient light conditions and/or other sensors, such as camera sensors and/or other sensors, can sense ambient lighting conditions. As an elaborate example, a house can include automated devices, such as automatic curtains in a bedroom and a device can sense ambient light conditions by knowing the device is in the bedroom, knowing the type of automatic curtains, such as blackout curtains, and knowing the automatic curtains are closed.

At 320, ambient light color conditions can be determined based on the sensed ambient light conditions. The ambient light color conditions can be determined based on sensed light of wavelengths between 450 and 485 nm because this light can affect a user's sleep patterns.

At 330, the effect of the ambient light color conditions on the user's circadian system can be determined. A simple or complex algorithm can be used to determine the effect of the ambient light color conditions on the user. The effect of the ambient light color conditions can also be determined just based on a certain period of time before a user falls asleep.

At 340, user device charging times when the user device is being charged can be monitored. User device charging times can include times of day, time durations of charging, times the user device starts charging, times the user device ends charging, and other user device charging times. These times can be based on plug-to-charge data when the user device is plugged into a charging source, data indicating when the user device is docked in a charging docking station, data indicating when the user device is coupled to a wireless charger, such an inductive charger, and other charging data.

At 350, user device motion including movement of the user device can be monitored. User device motion can be monitored and determined using a positioning system, using a compass, using a gyrometer, using an accelerometer, using an inclinometer, using deduced reckoning, using wireless signals, using triangulation, and/or using other elements that can determine device motion.

At 360, user device activity can be monitored. User device activity can be monitored and determined based on user input patterns, such as on a user interface, based on display activity, such as video playback activity, display brightness, and display engagement, based on audio input and output activity, such as user calls, ambient sounds, and music playing, based on user device controller activity, based on user device transceiver activity, and/or based on other information that can indicate the user is awake and actively using the user device.

At 370, color-modified image display times can be ascertained from at least one selected from the user device motion, the user device activity, and the user device charging times. The color-modified image display times can be based on sleep and wake times of a user modified by an offset. For example, color-modified image display times can be ascertained from a combination of factors that infer the user's sleep and wake times, such as the user device motion, the user device activity, and the user device charging times, plus a function that defines a temporal offset with respect to sleep and wake times during which the display image can be modified to prevent the user's circadian rhythm from being disrupted by blue light. As a further example, the color-modified display times can be ascertained to modify spectral characteristics of a displayed image a certain period of time, such as two hours, before a user's predicted sleep time and ascertained to stop modifying the displayed image a certain period of time before the user's predicted wake time Additional information that can be monitored and used to ascertain sleep and awake times can include a time of day including sunset and sunrise times, positioning information that ascertains the geographical location of the user device, calendar information that indicates when the user has engagements and appointments for which the user will be awake, alarm clock settings that can be used with a desired sleep period to determine when a user should fall asleep to get the desired amount of sleep, audio information collected from a microphone that can indicate when ambient noise is quiet and conducive to sleeping, biometric information, such as a user's heart rate sensed by a connected device, such as a pulse oximeter, and other biometric information, activity on other communicatively connected devices, and other information that can be used to ascertain color-modified image display times. The user device can also use additional sensors, such as biometric sensors, proximity sensors, accelerometers, gyroscopes, microphones, capacitive sensors, and/or any other sensors that can be included on the user device or communicatively coupled to the user device. These other sensors can detect information relating to a user's sleep and wake times. The other information can also include user input settings, such as desired sleep and awake times, desired amounts of sleep, settings that allow for blue light at certain given times or for a certain temporary time period, and other settings and parameters.

Machine-learning algorithms can also be used to identify patterns of other micro-location-related signals that correspond to a user's cyclical sleep cycle. For example, radio-frequency (RF) signature(s) throughout the day, such as specific WiFi Service Set Identifiers (SSIDs) that are in range of the device and their relative signal strength, specific Bluetooth devices that are in range and their relative signal strength, and other RF signatures, as well as light intensity and patterns over time, acoustic patterns, and other information can be correlated with device charging and other device activity inputs to refine a user's cyclical sleep/wake model to ascertain color-modified image display times. For example, a user may usually go to sleep at 11:00 PM, can turn out room lights at that time, and can retreat to the user's second floor bedroom that is further away from the user's WiFi hotspot, but closer to a Bluetooth speaker, and the bedroom can have a distinct acoustic profile, such as isolated from a low frequency acoustic hum of a refrigerator. Then, when the user decides to go to bed unusually early at 8:00 PM on a given night, the patterns of light, sound, and RF signals may be inferred to mean that the user is going to bed even though the bedtime is not in the historical time window.

At 380, at least one proximal device that is proximal to the user device can be communicated with. While in communication with the proximal device, color output adjustment signals can be sent to the proximal device based on the ambient light color conditions and the color-modified image display times. For example, the device can send the color output adjustment signals to other devices that output light so the other devices can adjust the color of the output light based on the ambient light color conditions and the color-modified image display times. To elaborate, when a device detects when to reduce the blue light, its capability can be used with other sources of blue light. For example, in a smart-home, a user device, such as a smartphone or other central hub, can reduce blue light from connected hue lights, televisions, laptops, and other devices that can emit blue light and that a user device can communicate with to adjust the emitted blue light. A proximal device can be considered proximal to the user device by being within viewing distance of the user device. The viewing distance can be within a given distance, such as 20 feet or less. The viewing distance can also be based on knowledge of a floor plan of the user's environment where devices can be considered proximal by detecting which room the user device is located in and which other devices a present in the room. The viewing distance can also be based on the user's presence in a building, such as a house, and the proximal devices can be all devices in the building, so light from the devices will not adversely affect a user's sleep patterns even if the user moves throughout the building. The viewing distance can also be based on other factors that take into account whether light output from other devices can affect a user's sleep patterns.

According to a possible implementation, a user device controller and/or other elements can determine devices proximal to the user device based on near field communication signals, wireless personal area network signals, IEEE 802.15 signals, infrared signals, ultrasound signals, wireless local area network signals, IEEE 802.11 signals, and/or other signals, from devices that send blue light transmission and/or other color transmission information, based on the user device location, based on a registry of devices in a particular location, and based on any other way of determining devices proximal to the user device. For example, a device can be considered proximal in that light emitted from the device can reach a user and can thus affect the user's circadian cycle. Blue light transmission information and/or other color transmission information can include just information about blue light transmitted by other devices and/or can include information about a spectrum of light transmitted by other devices.

According to possible embodiments, any and/or all connected devices in the vicinity of the user and their user device can be controlled to modify the amount of blue light in the user's overall environment to a level appropriate to the current phase of the user's circadian rhythm. The user device can leverage different and/or all communication systems including Bluetooth, Wi-Fi, ultrasound, and other communication systems to network with these light sensing or emitting devices. Some embodiments can use the relative location and blue light intensity data flowing from these sensors to modulate the blue light component emanating from all connected devices.

In some embodiments the user may be actively using the user device. In other embodiments, the user may not be actively using the user device. For example, a user can be reading a book near a smart-lamp that can be controlled by another device. The blue light of the smart-lamp can be decreased the user device intelligently by detecting the proximity of the user to the smart-lamp, the use of the smart-lamp, and the ambient color emitted by the smart-lamp, and by the user device sending signals to the smart-lamp. Presence sensors can be used to detect whether the user is nearby even if the user is not physically using the user device.

At 390, a color-modified image can be generated based on at least the ambient light color conditions and the color-modified image display times. For purposes of the present disclosure, the color-modified image can be any visual depiction that can be displayed on a display. For example, the color-modified image can be a home screen with icons, can be a picture, can be video, can be an application screen, such as a messaging screen, can include multiple tiled images, such as windows, can include banners on top of application screens, and/or can be any other visual depiction that can occupy an entire screen of a display.

The color-modified image can be generated by adjusting a display on the user device to generate the color-modified image. For example, the color-modified image can be generated by having display control circuitry adjust spectral characteristics of light output from the display. The color-modified image can also be generated prior to sending the image to the display, such as by using other hardware or software. The color-modified image can further be generated by modifying the spectral quality, such as the color, of the light of an image, by modifying the magnitude of the light of an image across the color spectrum, by modifying different magnitudes of light of an image in different portions of the color spectrum, and by other factors for modifying an image based on at least ambient light color conditions and color-modified image display times. For example, one image can be an awake image generated and displayed during a wake time period that is not within a time period window of a determined user sleep time period and the color-modified image can be a sleep image generated and displayed during a sleep-influence time period within a time period window of a determined user sleep time period. The color-modified image can also be generated based on other factors. For example, the color-modified image can also be generated based on a time offset that is selected to avoid disrupting the user's melatonin production for a period of time before the user historically goes to sleep.

The color-modified image can also be generated based on at least the effect of the ambient light color conditions on the user's circadian system. To elaborate, the color-modified image can be generated based on how the ambient light color conditions affect the color-modified image display times, which is influenced by the user's circadian system. For example, the color-modified image can be generated based on how spectral characteristics of the displayed image affect a human circadian system. Blue light, such as light of wavelengths between 450 and 480 nm, wavelengths between 459 and 485 nm, and/or other similar light, can affect a user's circadian system. When a user is exposed to blue light, the blue light can suppress the user's melatonin, which can inhibit sleep. The blue light can be reduced within a time period, such as two hours, 90 minutes, one hour, or any other useful time period, before the user falls asleep to allow the user to fall asleep easier.

The color-modified image can be modulated across a continuum of color balance and light intensity levels as recommended by a governing light-melatonin-sleep relationship. For example, the color-modified image may gradually vary in intensity and color balance the closer a user is to their sleep or awake time, where the color-modified image can be closer to a daytime, such as an awake, image the further the user is from their ascertained sleep time and the closer the user is to their wake time, and can become closer to a nighttime, such as a sleep, image the closer the user is to their ascertained sleep time. The daytime, such as the awake, image can be an image that is not modified for assisting a user with sleep and the nighttime, such as the sleep, image can be color-modified image for assisting the user with sleep.

According to a possible embodiment of generating the color-modified image, color of light emanating from controlled light sources that are controlled by the user device can be compared with ambient light color conditions. Comparing the color of light emanating from controlled light sources that are controlled by the device with ambient light color conditions can also include comparing magnitude, directionality, and/or other characteristics of light emanating from controlled light sources with ambient light color conditions. An amount of effect of light color emanating from the controlled light sources on a user can be calculated based on comparing color of light emanating from controlled light sources that are controlled by the user device with ambient light color conditions. The amount of effect of light color can be compared with a threshold. The color-modified image can then be generated based on at least the color-modified image display times and based on at least comparing the amount of effect of the light color with the threshold.

For an example of leveraging ambient light information and sleep state information, if a sleep sensing model indicates that a user is within two hours of their sleep start time and not yet out of their sleep finish time and the blue light emanating from devices under the system's control is greater than 25%, or any other useful threshold, such as approximately 20%, 30%, or any other useful percentage threshold, of the total ambient blue light, then the system can progressively filter the blue component of the display content for all system-controlled devices so that the proportion contribution remains less than 25% of that exposed to the user. The numbers proposed in this example can be finely tune based on other parameters. Additionally, the algorithm can be based on a plurality of other inputs including proximity of the light emitting devices, intensity of light, and even the user's age.

At 395, the color-modified image can be displayed. The color modified image can be displayed or a non-color modified image can be displayed on the display depending on the color-modified image display times and based on the how the display affects the user's circadian system. For example, if the user typically sleeps at a certain sleep time, the color modified image can be displayed for a period before the certain time and possibly up until the user awakes or a certain period of time before the user awakes. Otherwise, the non-color modified image can be displayed, such as when the user is awake and is not going to sleep within the period before the typical certain sleep time. As a further example, the display of the color modified image can be overridden by the user so that the non-color modified image is displayed regardless of the effect of the display on the user's circadian system.

The color-modified image can be displayed beginning at a predetermined time before a user's projected sleep time based on the effect of the ambient light color conditions on the user's circadian system. For example, the predetermined time can be one hour or more, 90 minutes, two hours, can be a time specific to a user based on the effect of the ambient light color conditions on the user's circadian system, can be a time that is general to average people based on the effect of the ambient light color conditions on their circadian system, and/or can be any other useful predetermined time based on the effect of the ambient light color conditions on the user's circadian system. Display of the color-modified image can start before the ascertained sleep time, such as before a sleep prediction algorithm predicts the user will want to fall asleep, and display of the color-modified image can remain in force until a period of time before the ascertained wake time, such as before the user is projected to begin waking up. The predetermined time before the ascertained sleep time and a predetermined time before the ascertained wake time can be based on a recommended light-melatonin-sleep relationship that can be stored in the device, calculated, or otherwise obtained.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 4:
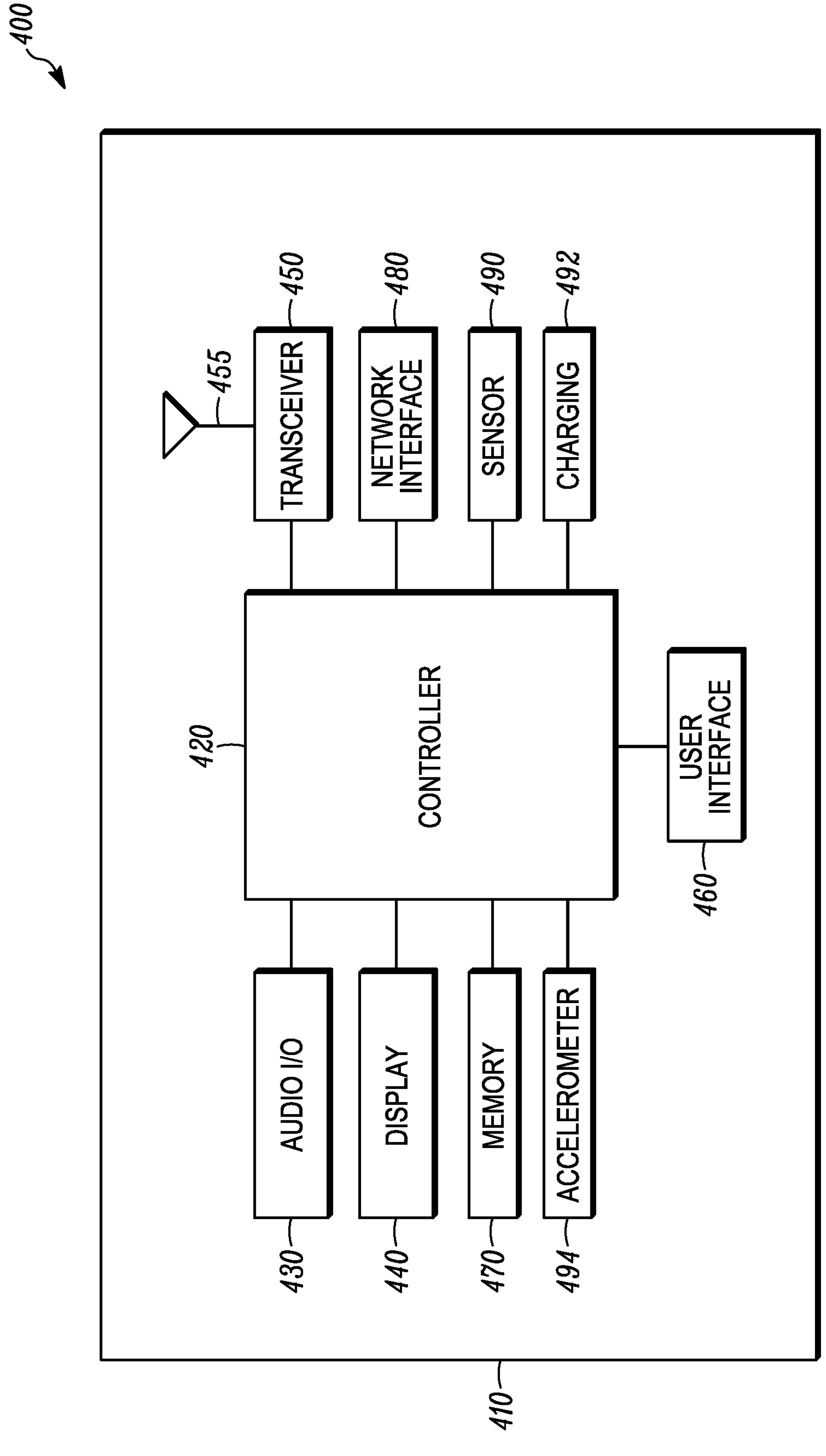
FIG. 4 is an example block diagram of a user device according to a possible embodiment.

FIG. 4 is an example block diagram of a user device 400, such as the user device 110, according to a possible embodiment. The user device 400 can include a housing 410, a controller 420 within the housing 410, audio input and output circuitry 430 coupled to the controller 420, a display 440 coupled to the controller 420, a transceiver 450 coupled to the controller 420, an antenna 455 coupled to the transceiver 450, a user interface 460 coupled to the controller 420, a memory 470 coupled to the controller 420, a network interface 480 coupled to the controller 420, at least one sensor 490 coupled to the controller 420, a charging port 492 coupled to the controller 420, and an accelerometer 494 coupled to the controller 420. The user device 400 can perform the methods described in all the embodiments.

The display 440 can be a viewfinder, a liquid crystal display (LCD), an LED display, a plasma display, a projection display, a touch screen, or any other device that displays information. The transceiver 450 can include a transmitter and/or a receiver and the user device can include multiple transceivers. The audio input and output circuitry 430 can include a microphone, a speaker, a transducer, or any other audio input and output circuitry. The user interface 460 can include a keypad, a keyboard, buttons, a touch pad, a joystick, a touch screen display, another additional display, or any other device useful for providing an interface between a user and an electronic device. The network interface 480 can be a Universal Serial Bus (USB) port, an Ethernet port, an infrared transmitter/receiver, an IEEE 1394 port, a WLAN transceiver, or any other interface that can connect a user device to a network, device, or computer and that can transmit and receive data communication signals. The memory 470 can include a random access memory, a read only memory, an optical memory, a flash memory, a removable memory, a hard drive, a cache, or any other memory that can be coupled to a user device.

The user device 400 or the controller 420 may implement any operating system, such as Microsoft Windows®, UNIX®, or LINUX®, Android™, or any other operating system. User device operation software may be written in any programming language, such as C, C++, Java or Visual Basic, for example. User device software may also run on an application framework, such as, for example, a Java® framework, a .NET® framework, or any other application framework. The software and/or the operating system may be stored in the memory 470 or elsewhere on the user device 400. The user device 400 or the controller 420 may also use hardware to implement disclosed operations. For example, the controller 420 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 420 may be any controller or processor device or devices capable of operating a user device and implementing the disclosed embodiments.

In operation, an ambient light condition receiver can receive ambient light conditions of light that is ambient to the user device. The received ambient light conditions can be signals and/or information. The ambient light condition receiver can be the sensor 490, can be the transceiver 450, can be the network interface 480, can be circuitry or a module of the controller 420, and/or can be any other element that can receive ambient light conditions. For example, the ambient light condition receiver can be circuitry, on or off of the controller 420, that transfers signals and/or information about the ambient light conditions from a light sensor of the sensor 490 to the controller 420. The ambient light condition receiver can also be the transceiver 450 that receives signals and/or information about the ambient light conditions from other devices. The ambient light condition receiver and also be any other element that can receive ambient light conditions for processing by the controller 420.

According to a possible implementation, the sensor 490 can be a light sensor that senses ambient light conditions, where the ambient light condition receiver can receive the ambient light conditions from the light sensor. The light sensor can be a camera or other light sensor coupled to the controller 420. The camera can be a front facing camera, a rear facing camera, and/or multiple cameras on one side or multiple sides of the user device 400. The light sensor can also be an active light sensor, a sensor dedicated to detecting blue light, or any other sensor that can detect ambient blue light. The light sensor can also detect other ambient light conditions along with the detected ambient blue light.

The controller 420 can determine ambient light color conditions based on the sensed ambient light conditions. The controller 420 can determine ambient light color conditions based on the received ambient light conditions having light of wavelengths between 450 and 485 nm.

The controller 420 can monitor user device charging times when the user device is being charged, such as using the charging port 492. The charging port 492 can be a wired charging port, can be an inductive charging port, and/or can be any other element that can charge a user device. The controller 420 can additionally monitor user device motion including movement of the user device. The controller 420 can further monitor user device activity.

The controller 420 can ascertain color-modified image display times from a combination of the user device motion, the user device activity, and the user device charging times. The controller 420 can also ascertain the color-modified image display times from user device geographical location, appointment information from a user calendar, alarm clock settings, and other information useful for ascertaining color-modified image display times. According to a possible implementation, the accelerometer 494 that can detect when the user device 400 is moving and the controller 420 can also ascertain color-modified image display times based on when the user device 400 typically stops moving at the end of the day.

The controller 420 can generate a color-modified image based on at least the ambient light color conditions and the color-modified image display times. The color-modified image can be an image that is modified to reduce the amount of blue light emitted from the display. The blue light can include bands of light including at least 459-485 nm. According to a possible implementation, the controller 420 can determine the effect of the ambient light color conditions on the user's circadian system and generate the color-modified image based on at least the ambient light color conditions, the color-modified image display times, and the effect of the ambient light color conditions on the user's circadian system.

When generating the color-modified image, the controller 420 can compare color of light emanating from controlled light sources that are controlled by the user device 400 with ambient light color conditions. The controller 420 can calculate an amount of effect of light color emanating from the controlled light sources on a user based on comparing color of light emanating from controlled light sources that are controlled by the user device with ambient light color conditions. The controller 420 can compare the amount of effect of light color with a threshold. The controller 420 can generate the color-modified image based on at least the color-modified image display times and based on at least comparing the amount of effect of the light color with the threshold.

According to a possible implementation, the controller 420 can include a position determination module that receives position signals and determine a location of the user device from the position signals. The controller 420 can generate the color-modified image based on at least the ambient light color conditions, the color-modified image display times, and the location of the user device. The position signals can include global positioning system signals, Wi-Fi signals, movement signals, such as from the accelerometer 494, for deduced reckoning, earth magnetic field signals from a compass, and other signals that can be used to determine a position of the user device 400.

According to a possible embodiment, the transceiver 450 can communicate with at least one proximal device that is proximal to the user device. While communicating with the at least one proximal device, the transceiver 450 can send color output adjustment signals to the proximal device based on the ambient light color conditions and the color-modified image display times.

The display 440 can display the color-modified image. The controller 420 can control the display 440 to display the color-modified image beginning at a predetermined time before a user's projected sleep time based on the effect of the ambient light color conditions on the user's circadian system.

According to a possible embodiment, the controller 420 can filter the emitted color from the display 440 to more contextually reduce or enhance the negative or positive impact to users, such as to their circadian cycle, without compromising the user experience, such as without degrading aesthetic user experience. The controller 420 can include software or hardware modules that monitor user device motion, user device activity, and/or device charging data. Additionally, dedicated software and/or hardware modules can also monitor user device motion, user device activity, and/or device charging data. The sleep and awake times can be ascertained by a sleep pattern determiner that can be software and/or hardware that is included in and/or operates on the controller 420 and/or can be dedicated software and/or hardware. The software and/or hardware modules can be coupled to other software and hardware by being separate from and/or residing within the other software and hardware.

According to a possible implementation, the controller 420 can include a light spectrum adjuster that can determine the ambient light color conditions and determine settings for the color-modified image or generate the color-modified image based on at least the ambient light color conditions and the color-modified image display times. The light spectrum adjuster can be a state machine that can register, communicate, and corroborate an on status, and/or color transmission including blue light transmission emanating from connected/unconnected devices.

According to a related embodiment, the controller 420 and/or light spectrum adjuster can receive information from all of the contextual inputs and sensors and appropriately vary the light spectrum output of the display in response to the relative impact of the display's output on the user's circadian cycle. This algorithm may adjust for the various inputs, such as whether indirect blue light is as significant as direct blue light.

According to different implementations, the controller 420 and/or sleep pattern determiner can also determine a user's sleep pattern based on when the user typically plugs the user device in for the last time for charging at night and/or unplugs it for the first time in the morning. The controller 420 and/or sleep pattern determiner can also determine a user's sleep pattern based on an alarm set on a user device alarm clock to wake the user up in the morning. The controller 420 and/or sleep pattern determiner can also determine a user's sleep pattern based on when a user stops using the user device, such as a typical time that the user device enters sleep mode for the night. The controller 420 and/or sleep pattern determiner can also determine a user's sleep pattern other ways of determining a user's sleep pattern.

According to another possible implementation, the sensor 490 can include a biometric sensor that detects when the user sleeps and the controller 420 and/or sleep pattern determiner can determine a user's sleep pattern based on results from the biometric sensor. The biometric sensor can be a camera that determines when the user is lying down, can be a microphone of the audio input and output 430 that detects the user's breathing patterns, can be a pulse sensor that determines a user's heart rate, can be a biometric input that receives wired or wireless signals from a wristband or other device that attaches to the user's body or otherwise determines biometric information that indicates a user's sleep patterns, and/or can be any other sensor that can sense biometric information.

This sleep pattern information can be used to adjust blue light in an image. For example, if the user device 400 knows that a user goes to bed at 10:00 PM, this can be a source of input to control and filter the emitted color from the user device 400. Automatic sleep detection can use machine learning techniques utilizing various sensors on the user device 400, including an ambient light sensor of the sensor 490, the accelerometer 494, charging patterns from the charging port 460, and other sensors.

According to different implementations, the user device 400 can be a mobile device, can be a television, a computer, a kitchen appliance with a display, a stereo component, a clock radio, and other electronic devices that can benefit from intelligent blue light filtering. Furthermore, connected devices can be made to act in concert in terms of sensing the ambient lighting spectrum, directionality and intensity; communicating each device's own level of blue light transmission; and adjusting the color spectrum including blue light transmission of each device in response to the ambient lighting conditions, time of day, and other factors, such as blue light filtering information from the light spectrum adjuster.

Embodiments can provide an algorithm that determines if a user's circadian cycle is within a time period of sleep and ambient blue light is below a threshold and/or below the amount of blue light being displayed by a user device, then the device can filter out at least some of the blue light. Embodiments can also provide for a device that can include sensing elements, such as an active light sensor, front/back cameras, awareness of location and time of day, and other sensing elements. The device can include state machines that register, communicate, and corroborate an on status and/or blue light transmission emanating from connected/unconnected devices. The device can also include a filtering feature, such as software or hardware, that filters the emitted color from electronic devices in order to more contextually reduce or enhance the negative or positive impact to users, such as to their circadian cycle, without compromising the user experience, such as without degrading an aesthetic user experience.

Embodiments can additionally provide an algorithm that can receive information from all of the contextual inputs and sensors and appropriately can vary the light spectrum output of one or more electronic devices in response to the relative impact of that device's transmission on the user's circadian cycle. This algorithm can adjust for the various inputs, such as whether indirect blue light is as significant as direct blue light.

Embodiments can also intelligently adjust the emitted light from electronic devices to ensure a combination of circadian rhythm and users aesthetic experience is not unnecessarily impacted. Embodiments can further provide for modifying a display of a portable electronic device based on ambient light and sleep patterns to influence the human circadian system. For example, ambient light conditions sensed by an ambient light sensor can be determined. Color-modified image display times can be determined from a combination of device motion, activity, and plug-in-to-charge data. A display of the portable electronic device can be adjusted to generate a color-modified image based on the plurality of ambient light color conditions and sleep and wake times. A certain image, color-modified or not, can be displayed on the display to achieve a desired effect on the human circadian system.

Embodiments can additionally provide for a method that includes determining ambient light conditions sensed by an ambient light sensor, determining color-modified image display times, such as the sleep and wake times of a user, from a combination of device motion, activity, and plug-in-to-charge data, adjusting the device display to generate a color-modified image based on the plurality of ambient light color conditions and sleep and wake times, and displaying a certain image, color-modified or not, on the display of the portable electronic device in order to achieve some desired effect on the human circadian system.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method comprising:

sensing ambient light conditions of light that is ambient to a user device;

determining ambient light color conditions based on the sensed ambient light conditions;

monitoring user device charging times when the user device is being charged;

monitoring user device motion including movement of the user device;

monitoring user device activity;

ascertaining color-modified image display times from at least one selected from the user device motion, the user device activity, and the user device charging times;

generating a color-modified image based on at least the ambient light color conditions and the color-modified image display times; and displaying the color-modified image, wherein monitoring the user device charging times comprises monitoring the user device charging times of at least a part of a day when the user device is being charged, and wherein ascertaining the color-modified image display times comprises ascertaining the color-modified image display times from at least the user device charging times.

2. The method according to claim 1, further comprising determining an effect of the ambient light color conditions on a user's circadian system, wherein generating the color-modified image comprises generating the color-modified image based on at least the ambient light color conditions, the color-modified image display times, and the effect of the ambient light color conditions on the user's circadian system.

3. The method according to claim 1, wherein sensing comprises sensing ambient light conditions of light that is ambient to the user device by using an ambient light sensor on the user device.

4. The method according to claim 1, wherein sensing comprises sensing ambient light conditions of light that is ambient to the user device by receiving information about ambient light conditions from sensors that are proximal to the user device and are wirelessly coupled to the user device.

5. The method according to claim 1, further comprising:

communicating with at least one proximal device that is proximal to the user device; and sending color output adjustment signals to the proximal device based on the ambient light color conditions and the color-modified image display times.

6. The method according to claim 1, further comprising:

comparing color of light emanating from controlled light sources that are controlled by the user device with ambient light color conditions;

calculating an amount of effect of light color emanating from the controlled light sources on a user based on comparing color of light emanating from controlled light sources that are controlled by the user device with ambient light color conditions; and comparing the amount of effect of light color with a threshold, wherein generating comprises generating the color-modified image based on at least the color-modified image display times and based on at least comparing the amount of effect of the light color with the threshold.

7. The method according to claim 1, wherein ascertaining color-modified image display times includes ascertaining color-modified image display times from a combination of user device motion, user device activity, and user device charging data.

8. The method according to claim 1, wherein determining ambient light color conditions based on the sensed ambient light conditions comprises determining ambient light conditions based on sensed light of wavelengths between 450 and 485 nm.

9. The method according to claim 1, wherein displaying the color-modified image comprises displaying the color-modified image beginning at a predetermined time before a user's projected sleep time based on the effect of the ambient light color conditions on the user's circadian system.

10. A user device comprising:

an ambient light condition receiver to receive ambient light conditions of light that is ambient to the user device;

a controller coupled to the ambient light condition receiver, the controller to determine ambient light color conditions based on the sensed ambient light conditions, monitor user device charging times when the user device is being charged, monitor user device motion including movement of the user device, monitor user device activity, ascertain color-modified image display times from at least one selected from the user device motion, the user device activity, and the user device charging times, and generate a color-modified image based on at least the ambient light color conditions and the color-modified image display times; and a display coupled to the controller, the display to display the color-modified image, wherein the controller monitors the user device charging times by monitoring the user device charging times of at least a part of a day when the user device is being charged, and wherein the controller ascertains the color-modified image display times by ascertaining the color-modified image display times from at least the user device charging times.

11. The user device according to claim 10, further comprising:

a light sensor coupled to the controller, the light sensor to sense ambient light conditions, wherein the ambient light condition receiver receives the ambient light conditions from the light sensor.

12. The user device according to claim 11, wherein the light sensor comprises a camera coupled to the controller.

13. The user device according to claim 10, wherein the controller determines the effect of the ambient light color conditions on the user's circadian system, and generates the color-modified image based on at least the ambient light color conditions, the color-modified image display times, and the effect of the ambient light color conditions on a user's circadian system.

14. The user device according to claim 10, further comprising a transceiver coupled to the controller, the transceiver to communicate with at least one proximal device that is proximal to the user device, and send color output adjustment signals to the proximal device based on the ambient light color conditions and the color-modified image display times.

15. The user device according to claim 10, wherein the controller compares color of light emanating from controlled light sources that are controlled by the user device with ambient light color conditions, calculates an amount of effect of light color emanating from the controlled light sources on a user based on comparing color of light emanating from controlled light sources that are controlled by the user device with ambient light color conditions, compares the amount of effect of light color with a threshold, and generates the color-modified image based on at least the color-modified image display times and based on at least comparing the amount of effect of the light color with the threshold.

16. The user device according to claim 10, wherein the controller ascertains the color-modified image display times from a combination of user device motion, user device activity, and user device charging data.

17. The user device according to claim 10, wherein the controller determines ambient light color conditions based on the received ambient light conditions having light of wavelengths between 450 and 485 nm.

18. The user device according to claim 10, wherein the controller controls the display to display the color-modified image beginning at a predetermined time before a user's projected sleep time based on the effect of the ambient light color conditions on the user's circadian system.

19. The user device according to claim 10, further comprising a charging port, wherein the controller monitors user device charging times when the user device is being charged using the charging port.

20. The user device according to claim 10, further comprising a position determination module coupled to the controller, the position determination module to receive position signals and determine a location of the user device from the position signals, wherein the controller generates a color-modified image based on at least the ambient light color conditions, the color-modified image display times, and the location of the user device.

* * * * *